US011194532B2

(12) United States Patent
Ito

(10) Patent No.: US 11,194,532 B2
(45) Date of Patent: Dec. 7, 2021

(54) INFORMATION PROCESSING APPARATUS HAVING PORTRAIT IMAGE GENERATION AND METHOD OF CONTROLLING THE SAME, PRINTING APPARATUS

(71) Applicant: CANON KABUSHIKI KAISHA, Tokyo (JP)

(72) Inventor: Chie Ito, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/063,796

(22) Filed: Oct. 6, 2020

(65) Prior Publication Data
US 2021/0019099 A1 Jan. 21, 2021

Related U.S. Application Data

(63) Continuation of application No. PCT/JP2019/008777, filed on Mar. 6, 2019.

(30) Foreign Application Priority Data

Apr. 13, 2018 (JP) .............................. JP2018-077798

(51) Int. Cl.
*G06F 3/12* (2006.01)
(52) U.S. Cl.
CPC .......... *G06F 3/1244* (2013.01); *G06F 3/1232* (2013.01); *G06F 3/1287* (2013.01)
(58) Field of Classification Search
CPC .. G06F 3/1232; G06F 3/1287; G06F 3/04845; G06F 2200/1614

(Continued)

(56) References Cited

U.S. PATENT DOCUMENTS 6,275,622 B1 * 8/2001 Krtolica .................. G06T 3/606
382/296
9,979,846 B2 5/2018 Kakitsuba
(Continued)

FOREIGN PATENT DOCUMENTS

JP 2014-063253 A 4/2014
JP 2016-144882 A 8/2016
(Continued)

OTHER PUBLICATIONS

PCT International Search Report dated May 7, 2019, in PCT/JP2019/008777.

(Continued)

*Primary Examiner* — Jamares Q Washington
(74) *Attorney, Agent, or Firm* — Venable LLP

(57) ABSTRACT

An information processing apparatus includes a controller including one or more processors and one or more memories. The controller receives attribute information of a printing apparatus from the printing apparatus, determines, based on the received attribute information, whether or not to generate a portrait image which format is a predetermined format, and rotates a landscape image in a predetermined rotational direction to generate the portrait image in a case it is determined the portrait image is to be generated. The controller also transmits the generated portrait image to the printing apparatus, and transmits information indicating that the portrait image has been generated from the landscape image.

20 Claims, 16 Drawing Sheets

(58) Field of Classification Search
USPC .............................. 358/1.15, 1.9, 1.13, 1.18
See application file for complete search history.

(56) References Cited

U.S. PATENT DOCUMENTS

| | | | |
|---|---|---|---|
| 10,212,309 B2 | 2/2019 | Kaneda | |
| 10,241,731 B2 | 3/2019 | Oya et al. | |
| 10,379,797 B2 | 8/2019 | Tabuki | |
| 2006/0055953 A1* | 3/2006 | Ishii | H04N 1/33376 |
| | | | 358/1.13 |
| 2006/0192796 A1* | 8/2006 | Toda | H04N 1/00278 |
| | | | 347/2 |
| 2015/0036188 A1* | 2/2015 | Miyake | G06F 3/1204 |
| | | | 358/1.15 |
| 2016/0165071 A1* | 6/2016 | Inoue | H04N 1/3877 |
| | | | 358/474 |

FOREIGN PATENT DOCUMENTS

| | | |
|---|---|---|
| JP | 2017-074685 A | 4/2017 |
| JP | 2017-132216 A | 8/2017 |

OTHER PUBLICATIONS

IPP Transition-Based Printing Extensions, PWG, pp. 1-31, Nov. 8, 2013.

\* cited by examiner

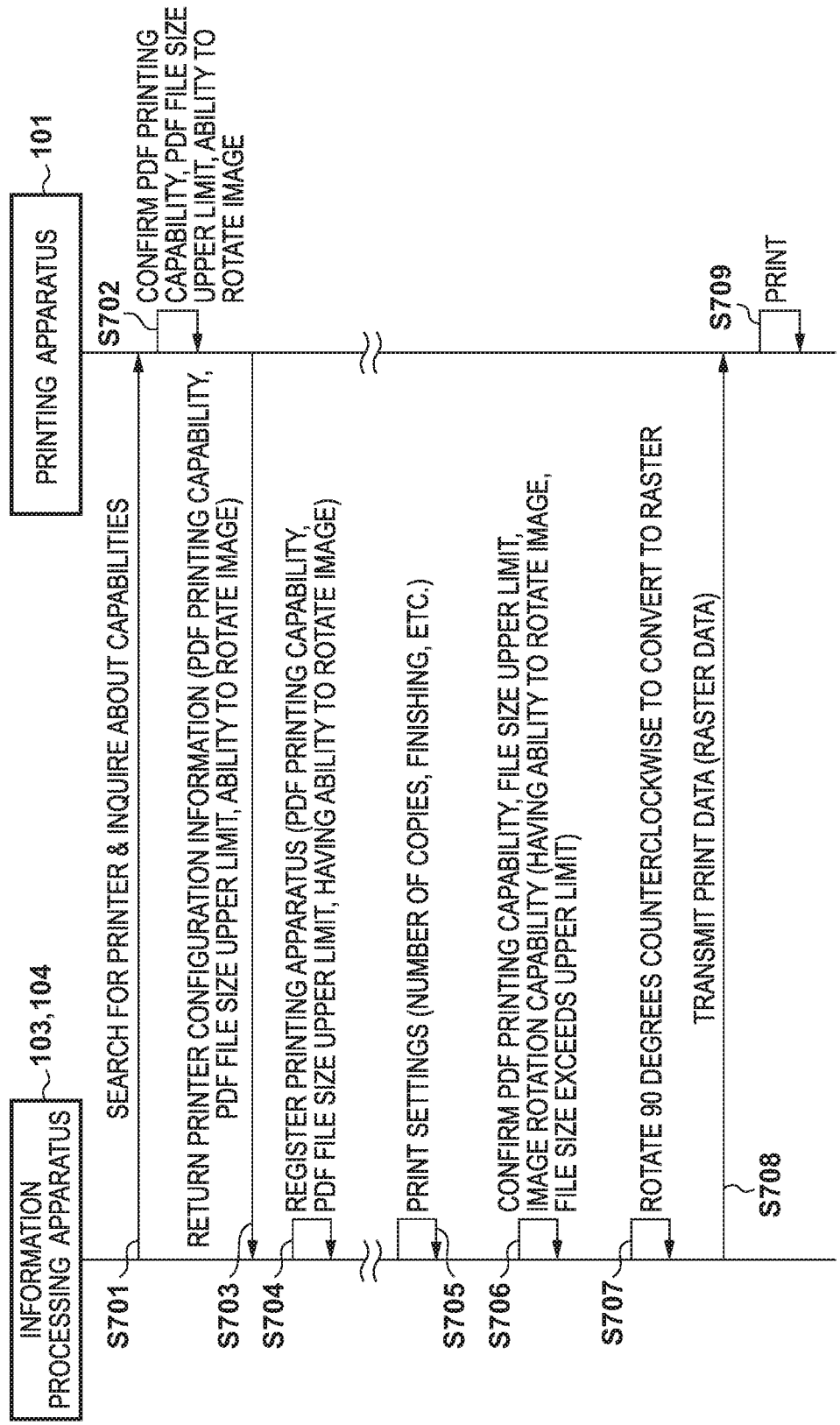

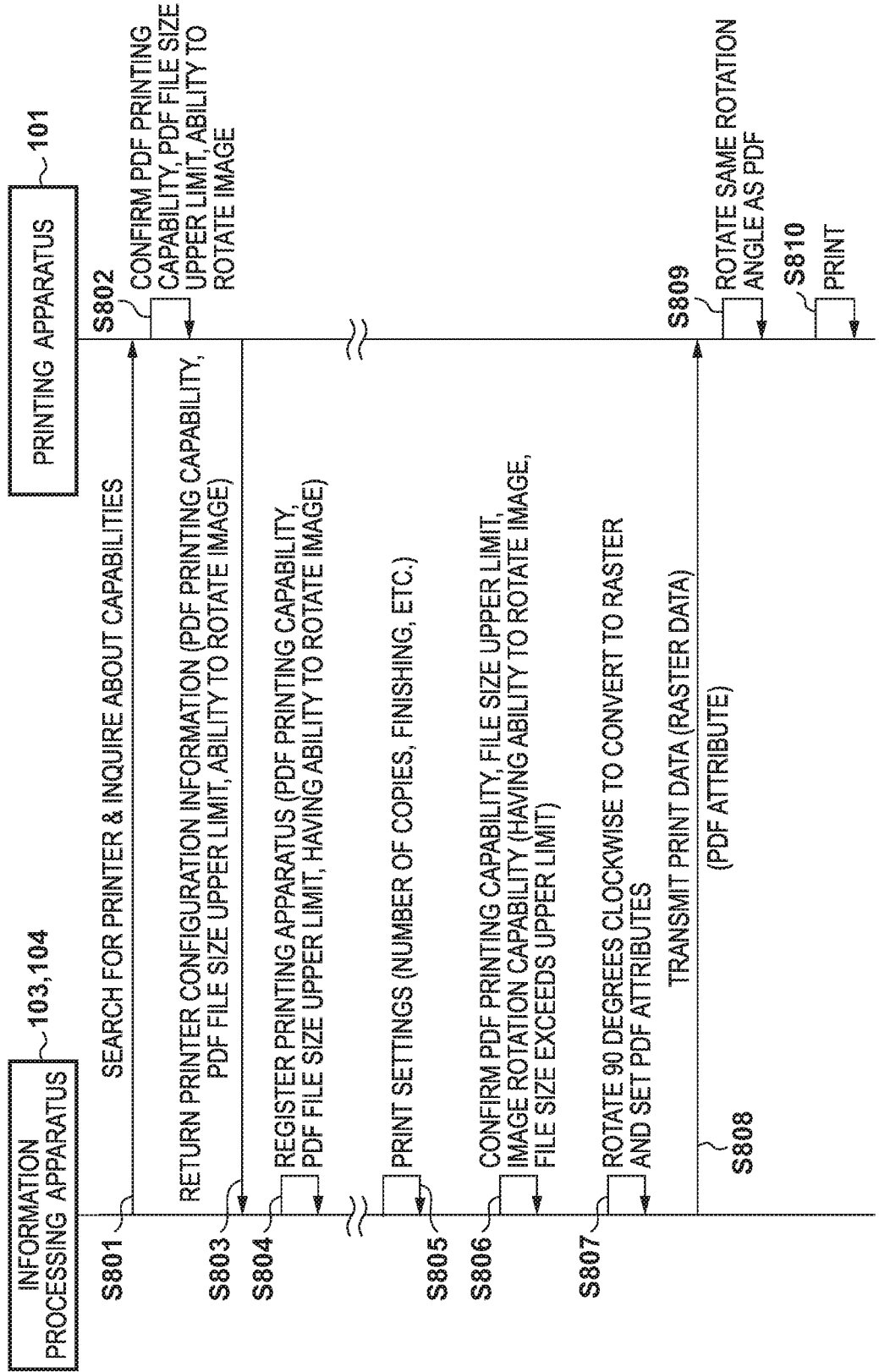

FIG. 9A

EXAMPLE OF PRINTER CAPABILITY NOTIFICATION

```
"Hypertext Transfer Protocol"
  POST /ipp/print HTTP/1.1/
  Content-Length : XXX
  Content-Type : application/ipp
  Host : ABCXXXX.local:631

User-AgentXXXOS Version11.0

Expect : 100-continue

"Internet Printing Protocol"
  Request = (
    operation-id: Get-Printer-Attributes operation-attributes-tag = {
        "attributes-charset" = "utf-8";
        "attributes-natural-language" = ja-jp;
        "printer-uri" = "ipp://xxxx.local.:631/ipp/print";

)
```
~900

FIG. 9B
EXAMPLE OF PRINTER CAPABILITY NOTIFICATION

```
"Hypertext Transport Protocol"
  HTTP/1.1 200 OK
  Server : ABC HTTP Server
  Content-Length : XXX
  Content-Type : application/ipp
  Connection : close "Internet Printing Protocol"
  Response = (
    operation-attributes-tag {
        "attributes-charset" = "utf-8";
        "attributes-natural-language" = "ja-jp";
    },
    printer-attributes-tag {

"charset-configured" = "utf-8";
        "charset-supported" = "utf-8";
        "color-mode-default" = default;
        "color-mode-supported" = (
           default,
           mono,
           color
        );
        "color-supported" = 1;
        "compression-supported" = none;
        "copies-default" = 1;
        "copies-supported" =         {
           lower = 1;
           upper = 9999;
        };

"document-format-supported" =
     ("application/octet-stream", "aplication/pdf");

"document-format-default" = "application/octet-stream";
        "document-format-preferred" = "application/pdf";
        "pdf-k-octets-supported"=2097152;

"pwg-raster-document-sheet-back" = "normal"

end-of-attribute-tag
  )
```

FIG. 9C

EXAMPLE OF PRINT JOB

```
"Hypertext Transfer Protocol"
  POST /ipp/print HTTP/1.1/
  Content-Length : XXX
  Content-Type : application/ipp
  Host : ABCXXXX.local:631

User-AgenXXXOS Version11.0

Expect : 100-continue

"Internet Printing Protocol"
  Request = (
    operation-id:Create-Job operation-attributes-tag = (
        "attributes-charset" = "utf-8";
        "attributes-natural-language" = en;
        "printer-uri" = "ipp://xxxx.local.:631/ipp/print";
        "requesting-user-name" = "suzuki"
    }
  );

job-attributes-tag = (
      "output-bin" = "auto";
      "print-color-mode" = "color";

<OMITTED>

"original-format" = "application/pdf";

<OMITTED>

);
```

— 910

911

912

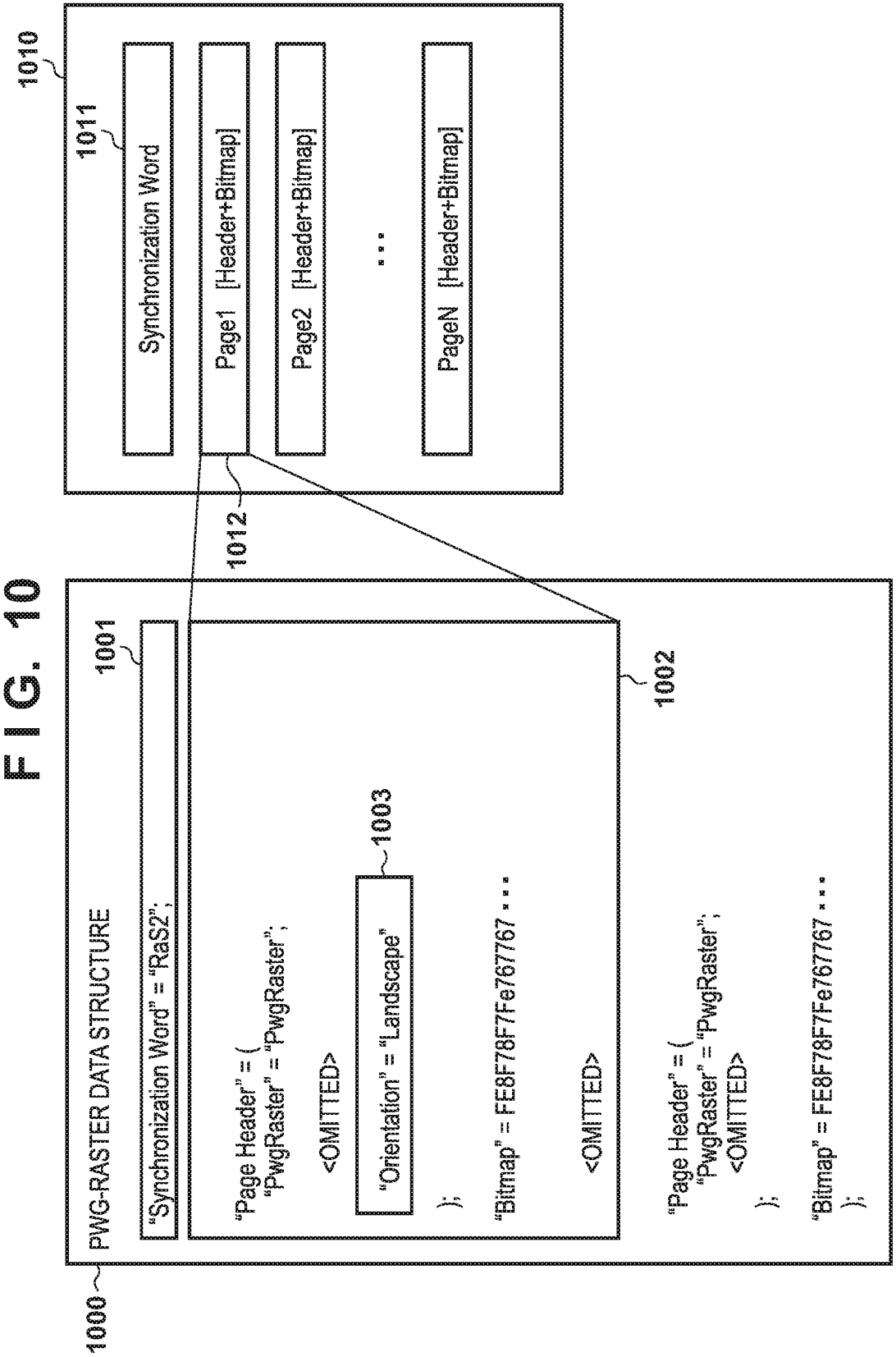

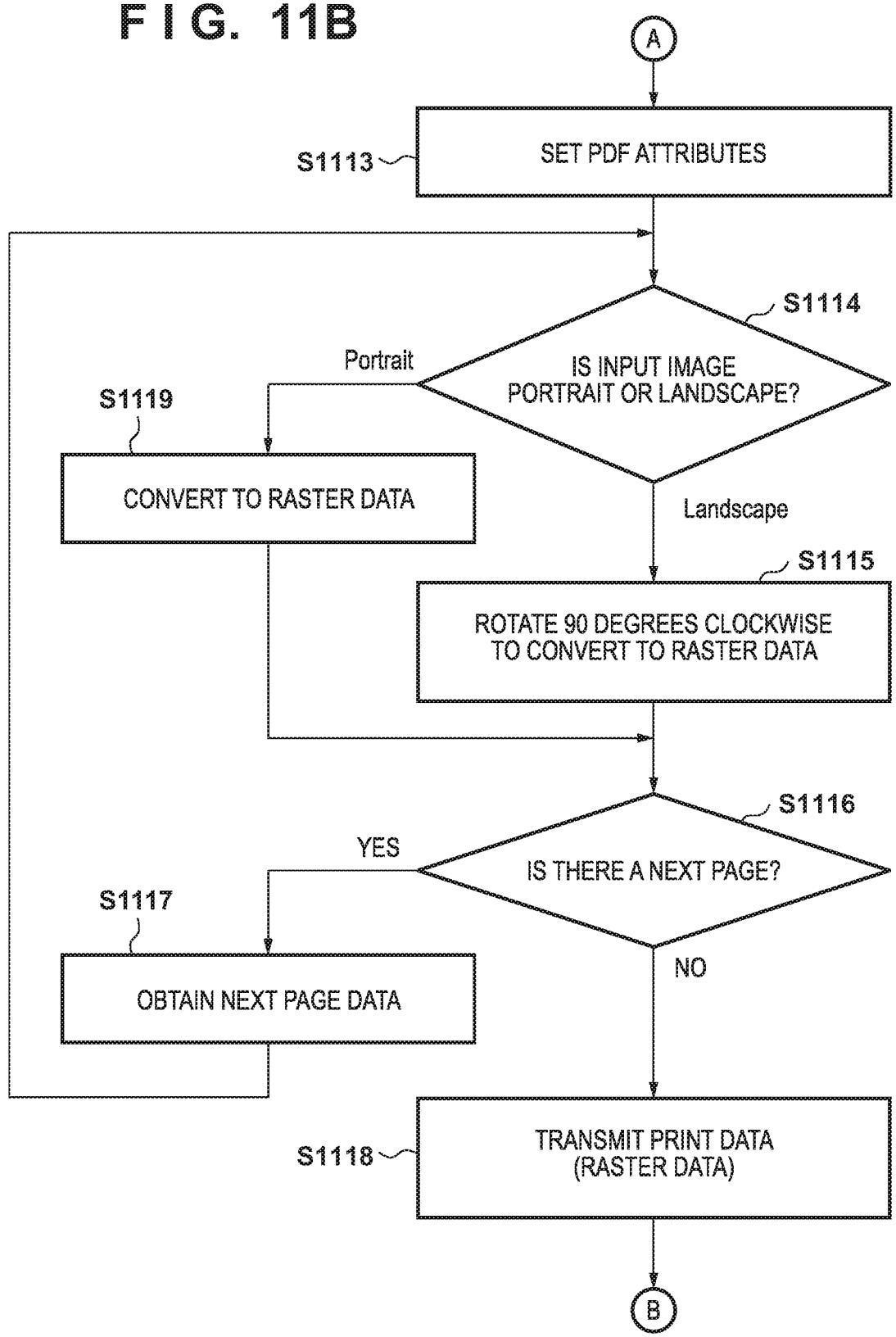

INFORMATION PROCESSING APPARATUS HAVING PORTRAIT IMAGE GENERATION AND METHOD OF CONTROLLING THE SAME, PRINTING APPARATUS

CROSS-REFERENCE TO RELATED APPLICATIONS

This application is a Continuation of International Patent Application No. PCT/JP2019/008777, filed Mar. 6, 2019, which claims the benefit of Japanese Patent Application No. 2018-077798, filed Apr. 13, 2018, both of which are hereby incorporated by reference herein in their entirety.

BACKGROUND OF THE INVENTION

Field of the Invention

The present invention relates to an information processing apparatus and a method of controlling the same, and a printing apparatus.

Background of Art

Some printing devices connect to a network, receive print data from an information processing device over the network, and print the data. Such an information processing device uses a printer driver (or a printing application; called simply a "printer driver" hereinafter), which is designed for use with an individual printing device, to generate print data suited to that printing device, and transmits that data as a print job.

In recent years, print data is being generated by a generic printer driver (or a generic printing application) incorporated into an information processing device, or by a printing server in the cloud, and is then transmitted to a printing device, instead of using a printer driver optimized for an individual printing device. With this kind of generic printing service, a network protocol for transmitting the print data to the printing device and causing the printing device to execute the print (IPP: Internet Printing Protocol) is provided, and printing processing is realized by the printing device and the information processing device communicating with each other according to this protocol.

It is desirable that a print server or an information processing device which provides a generic print service compliant with a standard such as IPP be compatible with a variety of types of printing devices. To be able to handle functions, specifications, and so on which differ from printing device to printing device, an information processing device which uses a generic print service must manage configuration information of each printing device as part of the generic printing service. This configuration information includes device configurations, such as whether or not a finisher is provided, capability information such as printable formats and whether or not image rotation and the like can be performed on the printing device side, and so on.

CITATION LIST

Non-Patent Literature

NPTL 1: PWG 5100.16-IPP Transaction-Based Printing Extensions 6.4.7 PDF-k-octets-supported Portable Document Format ("PDF" hereinafter) files are often used as data to be printed in printing systems which use the IPP protocol. As one piece of the configuration information, a printing device that supports PDFs notifies the information processing device, printing server, or the like of the maximum data size of PDF files that can be received.

In a specific type of printing system which uses the IPP protocol, when printing landscape data, where the printing is performed with the paper oriented in the horizontal direction, the landscape data is rotated 90 degrees and then transmitted. On the other hand, when transmitting PDF file data, control is performed so as to rotate landscape data 90 degrees in the counterclockwise direction. Furthermore, when transmitting PWG-Raster data, control is performed so as to transmit the data after rotating it 90 degrees in the clockwise direction.

Here, consider a case where, for some reason, a PDF file is converted to the PWG-Raster format and printed. If at this time the PDF is simply converted to the PWG-Raster format, a landscape image, which originally must be rotated 90 degrees in the counterclockwise direction, will instead be rotated 90 degrees in the clockwise direction, resulting in the orientation of the image being inverted by 180 degrees. As such, if, for example, a finishing setting is active in the print settings, the right side of the paper will be located at the top of the printed image, despite it being assumed that the left side of the paper will be located at the top, resulting in a risk of the output item not matching the user's intentions. Additionally, when printing a PDF file, there has been a problem in that if the file exceeds the maximum data size which can be received on the printing device side, it may not be possible to print the file on the printing device side even if the PDF file is transmitted to the printing device.

An object of the present invention is to eliminate at least one of the above-mentioned problems with the conventional technology.

One object of the present invention is to provide a technique in which when converting the format of print data, an output result equivalent to that of the pre-conversion format can be obtained even when converting to a format which has different behavior with respect to rotation angles.

Another object of the present invention is to provide a technique, in a case where it is assumed that a printing apparatus cannot print on the basis of print data in a predetermined format, for converting the print data to a different format and transmitting the converted print data.

SUMMARY OF THE INVENTION

According to a first aspect of the present invention, there is provided an information processing apparatus comprising:
a controller including one or more processors and one or more memories, wherein the controller is configured to:
receive attribute information of a printing apparatus from the printing apparatus;
determine a rotational direction of a landscape image based on the received attribute information;
rotate the landscape image in the determine rotational direction to generate a portrait image; and
transmit the portrait image to the printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain principles of the present invention.

FIG. 7 is a sequence chart for describing the flow of printing processing executed between the information processing apparatus and the printing apparatus according to the embodiment.

FIG. 8 is a sequence chart for describing the flow of printing processing executed between the information processing apparatus and the printing apparatus according to the embodiment.

FIG. 9A is a diagram illustrating an example of a message pertaining to a capability inquiry output to the printing apparatus from the information processing apparatus.

FIG. 9B is a diagram illustrating an example of a capability response sent from the printing apparatus to the information processing apparatus in response to the capability inquiry.

FIG. 9C is a diagram illustrating an example of a job ticket of a print job generated by the information processing apparatus having received a capability notification from the printing apparatus.

FIG. 10 is a diagram illustrating an example of the data structure and data in the PWG-Raster format according to the embodiment.

FIG. 11B is a flowchart for describing processing through which an application in the information processing apparatus accepts a printing instruction and transmits print data to the printing apparatus, according to the embodiment.

DESCRIPTION OF THE EMBODIMENTS

Hereinafter, an embodiment of the present invention will be described in detail with reference to the attached drawings. The following embodiment is not intended to limit the present invention as set forth in the scope of patent claims, and not all of the combinations of the features that are described in the embodiment are necessarily required with respect to the means to solve the problems according to the present invention.

Figure 1:
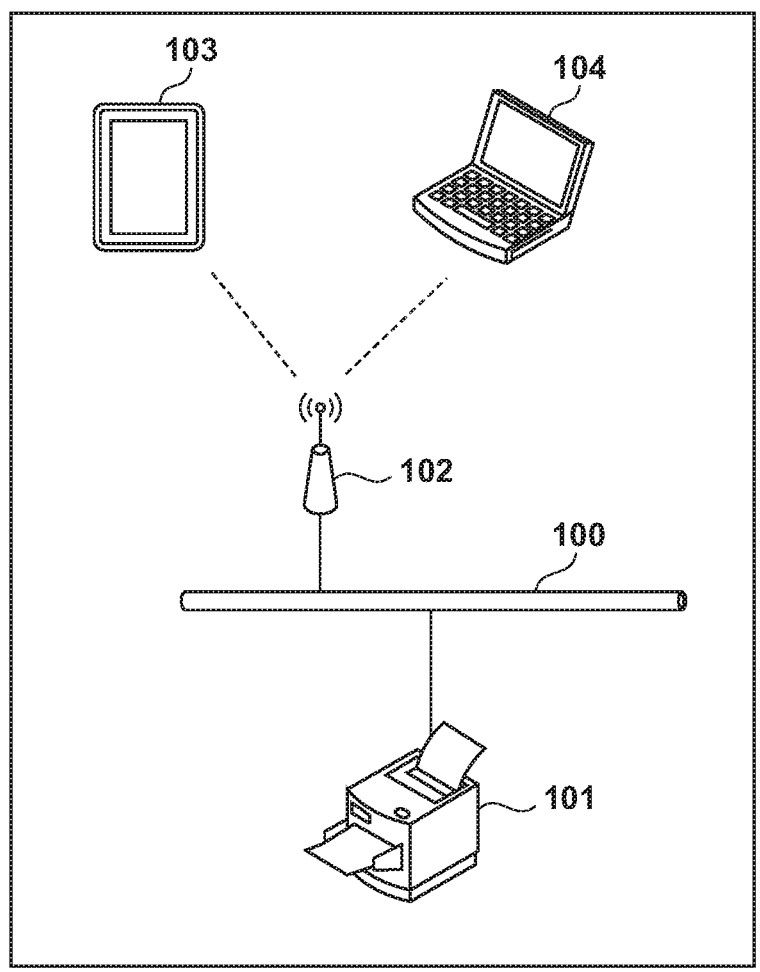
FIG. 1 is a diagram for describing the configuration of a printing system according to an embodiment of the present invention.

FIG. 1 is a diagram for describing the configuration of a printing system according to the embodiment of the present invention.

A printing apparatus 101 and an AP (access point) 102 are communicably connected to each other on a LAN (Local Area Network) 100. Here, mobile terminals 103 and 104, such as a tablet and a laptop computer, will be described as examples of information processing apparatuses. Note that in the following descriptions, the tablet 103, the laptop computer 104, and the like will be collectively referred to as "information processing apparatuses". These information processing apparatuses can communicate with the printing apparatus 101 on the LAN 100 via the AP 102. Although the embodiment describes the above configuration as an example of a printing system, it should be noted that the present invention is not limited thereto, and it is sufficient for at least one information processing apparatus and printing apparatus to be communicably connected over a network. The network may be wireless or wired.

The printing apparatus 101 will be described next. The printing apparatus 101 has a printing function for printing an image onto a sheet (recording medium), and executes printing processing on the basis of print data received over the network 100.

Figure 2:
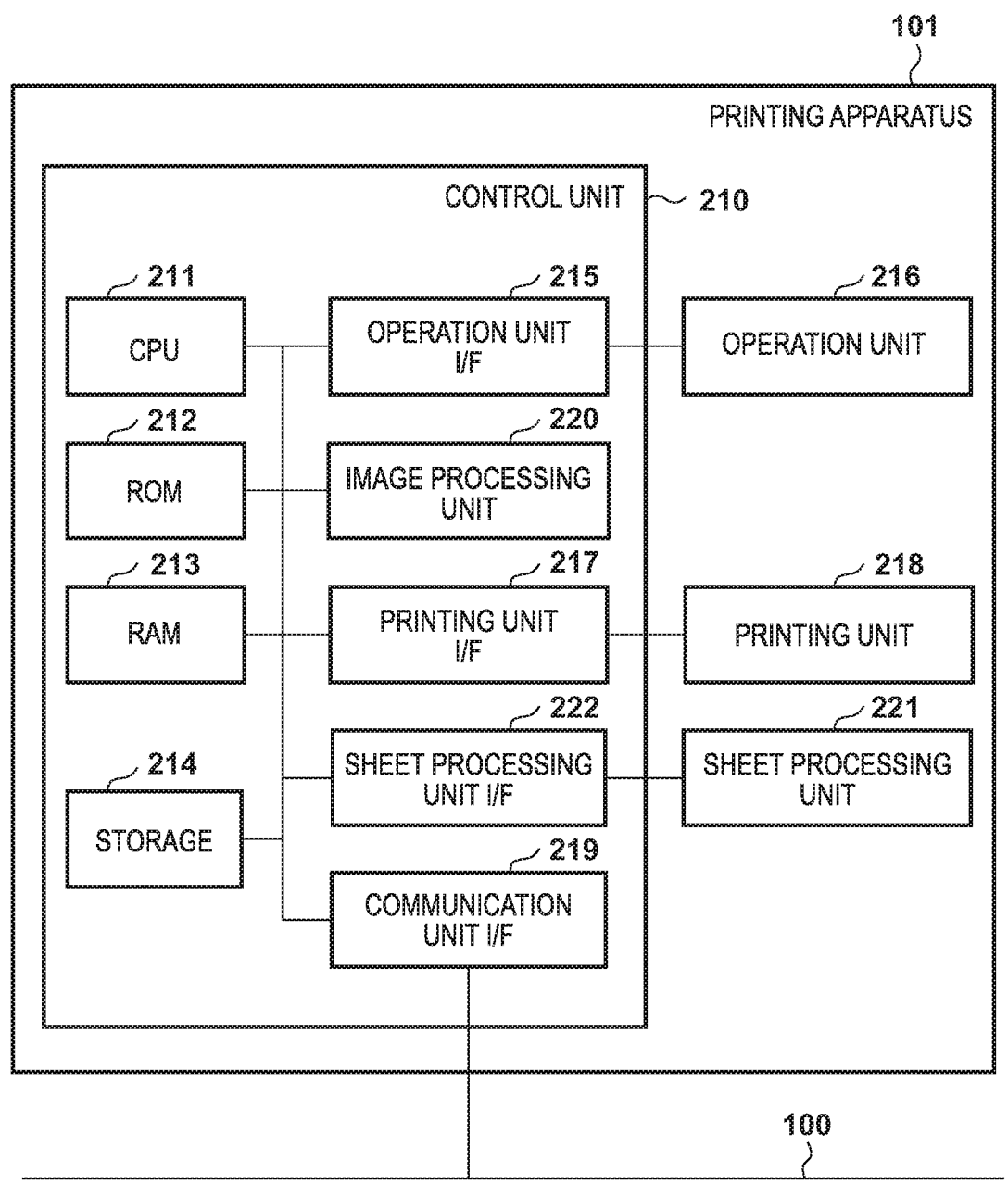
FIG. 2 is a block diagram for describing the hardware configuration of a printing apparatus according to the embodiment.

FIG. 2 is a block diagram for describing the hardware configuration of the printing apparatus 101 according to the embodiment.

A control unit 210, which includes a CPU (Central Processing Unit) 211, controls the operations of the printing apparatus 101 as a whole. The CPU 211 controls printing by deploying a program, stored in ROM (Read Only Memory) 212 or storage 214, into RAM 213 and executing the program. The ROM 212 can store control programs, a boot program, and the like that can be executed by the CPU 211. The RAM (Random Access Memory) 213 is primary storage memory of the CPU 211, and is used as a work area or a temporary storage region for loading various types of control programs. The storage 214 stores print data, image data, various types of programs, and various types of setting information. Although the embodiment assumes an auxiliary storage device such as an HDD (Hard Disk Drive) is used as the storage 214, non-volatile memory such as an SSD (Solid State Drive) may be used as well.

With the printing apparatus 101 of the embodiment, the one CPU 211 is assumed to execute the various processes in the flowcharts described later using a single memory (the RAM 213). However, another form may be employed instead. For example, the processes in the flowcharts described later may also be executed by having a plurality of CPUs, RAM, ROM, and storage operating cooperatively. Some processes may be executed using hardware circuitry such as an ASIC (Application Specific Integrated Circuit) or an FPGA (Field-Programmable Gate Array).

An operation unit interface (I/F) 215 connects an operation unit 216 to the control unit 210. The operation unit 216 is provided with a display unit having touch panel functionality, various types of physical keys, and so on, and functions as a display unit that displays various types of information, an accepting unit that accepts user instructions, and the like. A printing unit I/F 217 connects a printing unit (printer engine) 218 to the control unit 210. Image data generated after analyzing a print job received from an information processing apparatus is transferred from the control unit 210 to the printing unit 218 via the printing unit I/F 217. The printing unit 218 receives control commands, image data to be printed, and so on from the control unit 210, and prints an image onto a sheet fed from a paper feed cassette (not shown) on the basis of the commands, data, and so on. A sheet processing unit I/F 222 connects a sheet processing unit 221 to the control unit 210. The sheet processing unit 221 receives control commands from the CPU 211 and performs post-processing on the sheet printed by the printing unit 218 in accordance with those control commands. For example, post-processing such as aligning multiple sheets, separating multiple sheet discharge destination points into multiple trays, saddle-binding, punching holes, and binding multiple sheets is performed. The printing method of the printing unit 218 may be an electrophotographic method or an ink jet method. Other printing methods, such as thermal transfer, can also be applied. The control unit 210 is also connected to the LAN 100 via a communication unit I/F 219. The communication unit I/F 219 transmits image data, information, and the like to an information processing apparatus on the LAN 100 and receives print jobs, information, and the like from the information processing apparatus on the LAN 100.

An image processing unit 220 has RIP (Raster Image Processor) functionality for generating image data used in printing by developing a print job received via the LAN 100. The image processing unit 220 can also perform resolution conversion, correction processing, rotation processing, and the like on the image data obtained by developing the print job. Although the image processing unit 220 may be realized by hardware circuitry (an ASIC, FPGA, or the like), the image processing unit 220 is not limited thereto. For example, the printing apparatus 101 may further include a processor for image processing applications, and the processor may realize image processing, processing for developing into print data, and the like by the processor executing an image processing program. In this case, it is assumed that the processor and the CPU 211 operate cooperatively to realize the processing described in the flowcharts described below. Furthermore, a configuration in which the CPU 211 executes a program to perform image processing, and performs image processing, processing for developing the print data, and so on can be employed as well. The image processing may also be performed through a combination of any of these.

Configuration information and capability information, such as formats which the printing apparatus 101 can print, the ability to rotate images, and the maximum data size of PDF files that can be received, is stored in the storage 214 or the RAM 213 by the control unit 210 in advance (e.g., when the printing apparatus 101 is started up).

Figure 3:
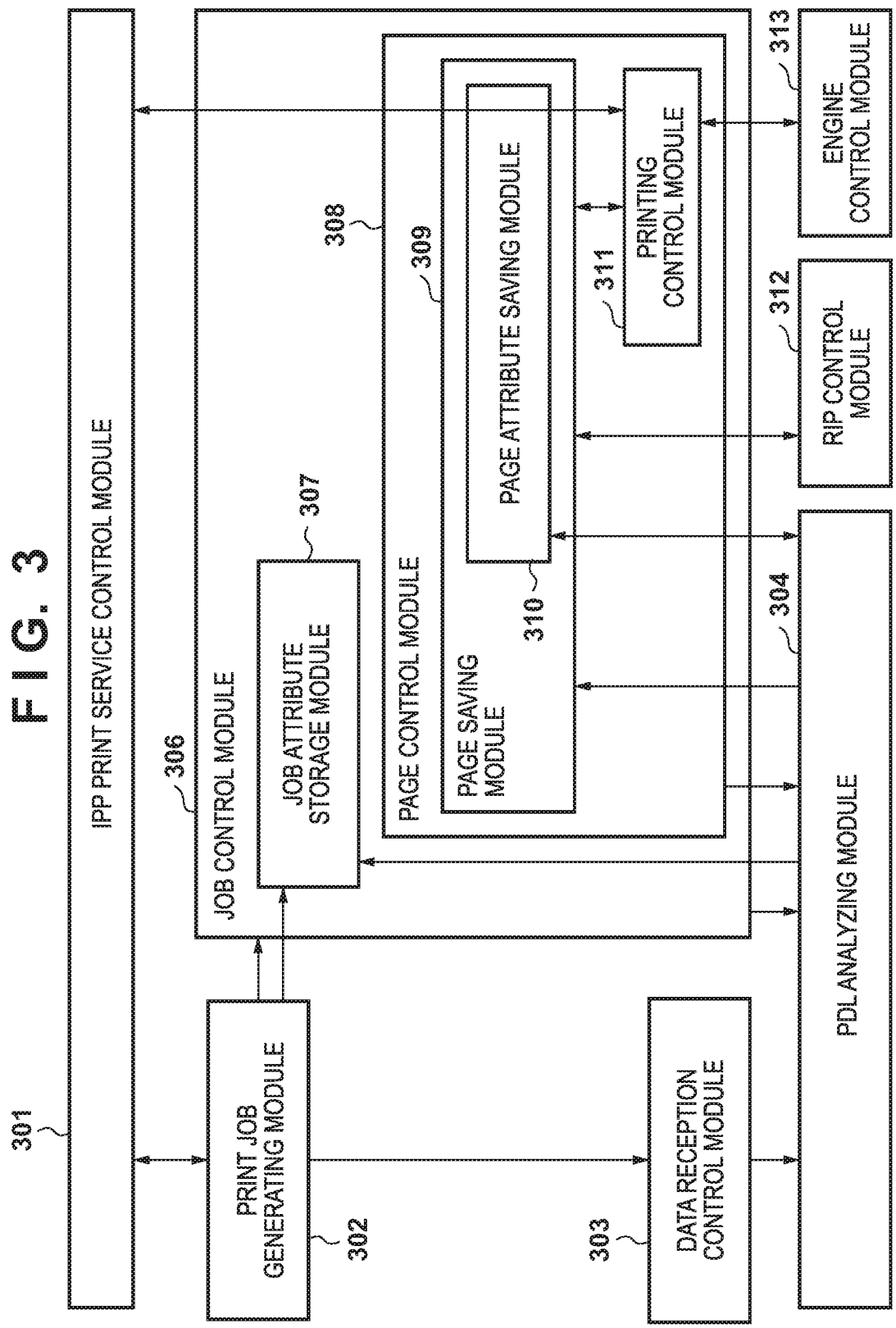
FIG. 3 is a function block diagram for describing the software configuration of the printing apparatus according to the embodiment.

FIG. 3 is a function block diagram for describing the software configuration of the printing apparatus 101 according to the embodiment. It is assumed that each of the function blocks illustrated in FIG. 3 is realized by the CPU 211 executing programs deployed into the RAM 213.

An IPP print service control module 301 obtains the configuration information of the printing apparatus 101 from an engine control module 313 via a printing control module 311. The printing apparatus 101 communicates the obtained configuration information, along with the capability information stored in the RAM 213 or the storage 214, to the information processing apparatus together as "printer capability information".

Processing of the print job will be described next. Upon receiving a print job based on the IPP standard over the network 100 from an information processing apparatus, the IPP print service control module 301 passes the print job to a print job generating module 302. The print job generating module 302 receives the print job from the information processing apparatus via the IPP print service control module 301 and writes the print job into a data reception control module 303, registers the print job as a new job in a job control module 306, and requests the printing processing to be started. The print job generating module 302 passes print settings information to be applied to the print job to a job attribute saving module 307. The data reception control module 303 is a buffer region for print jobs received from the print job generating module 302, and temporarily saves each print job in the storage 214. When the job control module 306 instructs a PDL analyzing module 304 to perform PDL analysis processing on the print job, the PDL analyzing module 304 requests the print job for the data reception control module 303. In response, the data reception control module 303 passes the data of the print job to the PDL analyzing module 304. Through this, the PDL analyzing module 304 generates intermediate rendering data and page attributes in accordance with the PDL language specifications, and saves the results of this processing in a page saving module 309 and a page attribute saving module 310. The page data created by the PDL analyzing module 304 is saved in the page saving module 309 and the page attribute saving module 310 on a page-by-page basis. The attributes saved in the job attribute saving module 307 include a "number of copies", as well as "Nup (multiple pages on a single sheet)", "print side (single-sided/double-sided) settings", "color/monochromatic mode", "finishing settings", and so on, which are set as IPP job attributes. All of these are managed by the job attribute saving module 307 in association with a job ID.

A page control module 308 controls the page analysis processing performed by the PDL analyzing module 304, RIP processing performed by a RIP control module 312, and printing control processing performed by the printing control module 311. The printing control module 311 obtains RIP-processed image data from the page saving module 309, converts the data into CMYK colors, and transfers the converted data to the engine control module 313. The engine control module 313 obtains the individual CMYK image data from the printing control module 311 on a page-by-page basis, and controls the printing unit 218 to perform printing processing for each page.

Figure 4:
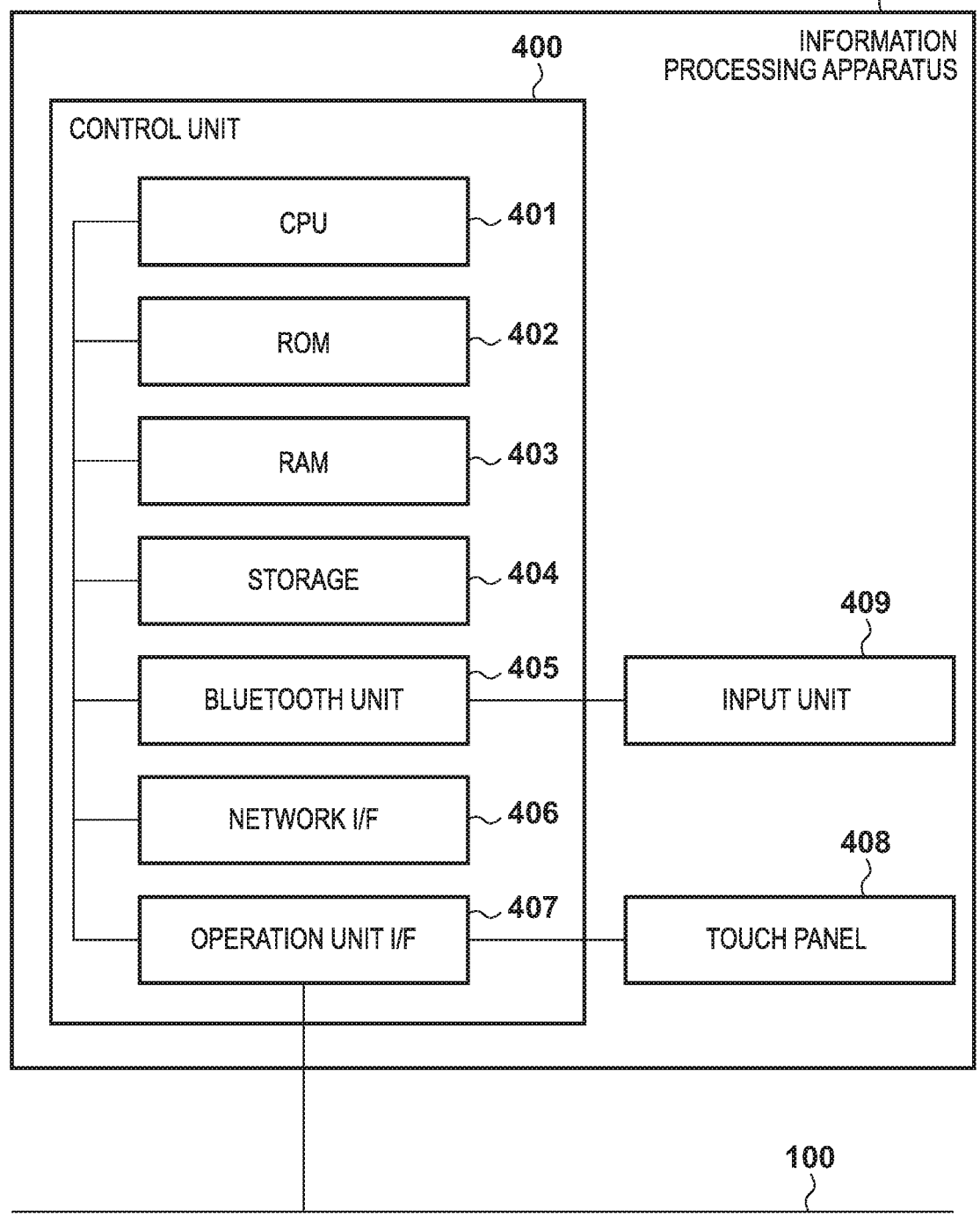
FIG. 4 is a block diagram for describing the hardware configuration of an information processing apparatus according to the embodiment.

FIG. 4 is a block diagram for describing the hardware configuration of the information processing apparatus according to the embodiment. These descriptions assume that the information processing apparatuses 103 and 104 have the same hardware configuration and software configuration.

A control unit 400, which includes a CPU 401, controls the operations of the information processing apparatus 103 or 104 as a whole. The CPU 401 performs computational processing by deploying a program, stored in ROM 402 or storage 404, into RAM 403 and executing the program. The ROM 402 can store control programs, a boot program, and the like that can be executed by the CPU 401. The RAM 403 is primary storage memory of the CPU 401, and is used as a work area or a temporary storage region for loading various types of control programs. The storage 404 stores application data, print data, various types of programs, and various types of setting information. Although the embodiment assumes that the storage 404 is an SSD, the storage 404 may be an HDD or the like instead. A Bluetooth (registered trademark) unit 405 connects an input unit 409 such as a keyboard or a pointing device. A network I/F 406 connects to a wireless LAN or the like. A touch panel 408 connected via an operation unit I/F 407 senses drawings, touch inputs, and the like made on a screen by a user. The touch panel 408 is provided with a display unit having touch panel functionality, and functions as a display unit that displays information, an accepting unit that accepts user instructions, and the like. The control unit 400 can connect to the wireless LAN via the network I/F 406.

With the information processing apparatuses 103 and 104 of the embodiment, the one CPU 401 is assumed to execute the various processes in the flowcharts described later using a single memory (the RAM 403). However, another form may be employed instead. For example, the processes in the flowcharts described later may also be executed by having a plurality of CPUs, RAM, ROM, and storage operating cooperatively.

Figure 5:
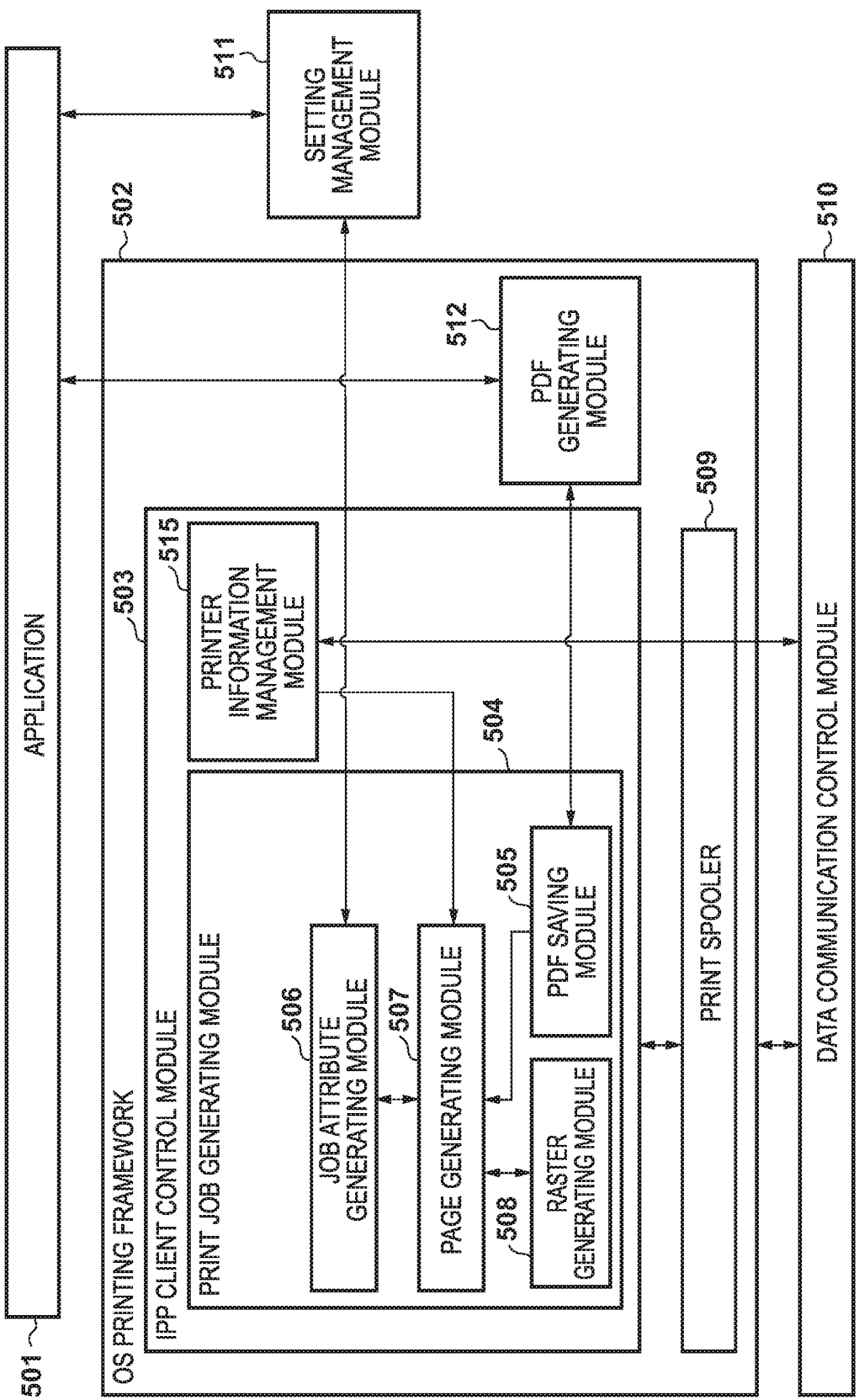
FIG. 5 is a function block diagram for describing the software configuration of the information processing device according to the embodiment.

FIG. 5 is a function block diagram for describing the software configuration of the information processing apparatus according to the embodiment. It is assumed that each of the function blocks illustrated in FIG. 5 is realized by the CPU 401 executing programs deployed into the RAM 403.

An application 501 is an application that runs on the information processing apparatus, and provides typical application functions such as word processing or spreadsheets to a user. When a user calls a printing function through the application 501, the application 501 displays a print settings screen (not shown), and the user makes various types of settings, such as setting a number of copies, finishing, and the like. The details which have been set are saved into a settings managing module 511.

An OS printing framework 502 includes an IPP client control module 503, a print spooler 509, and a PDF generating module 512. The IPP client control module 503 has a print job generating module 504 and a printer information managing module 515. The print job generating module 504 generates a print job in accordance with instructions from the application 501. The printer information managing module 515 holds the printer capability information obtained from the printing apparatus 101. The PDF generating module 512 receives data from the application 501 and generates PDF data. A PDF saving module 505 saves all of the pages of the PDF data generated by the PDF generating module 512. The print spooler 509 sequentially transmits the print job generated by the IPP client control module 503 to the printing apparatus 101 via a data communication control module 510. The printer information managing module 515 obtains and holds printer capability information from the printing apparatus 101 through the data communication control module 510.

A job attribute generating module 506 and a page generating module 507 receive an instruction to generate print data from the application 501, and start processing. The job attribute generating module 506 generates setting information for an IPP job in accordance with instructions from the settings managing module 511. The page generating module 507 refers to the capability information of the printing apparatus 101 held by the printer information managing module 515, job attribute information held by the job attribute generating module 506, and the size of the PDF data saved in the PDF saving module 505. The page generating module 507 obtains the page data saved in the PDF saving module 505 in page order. Raster print data is generated in conjunction with a raster generating module 508 according to the referenced information, or PDF print data is generated by rotating the PDF data as necessary. A page header including the page orientation, information indicating the front and back of the page for double-sided printing, and so on is added as well. This processing will be described in detail later.

Figure 6:
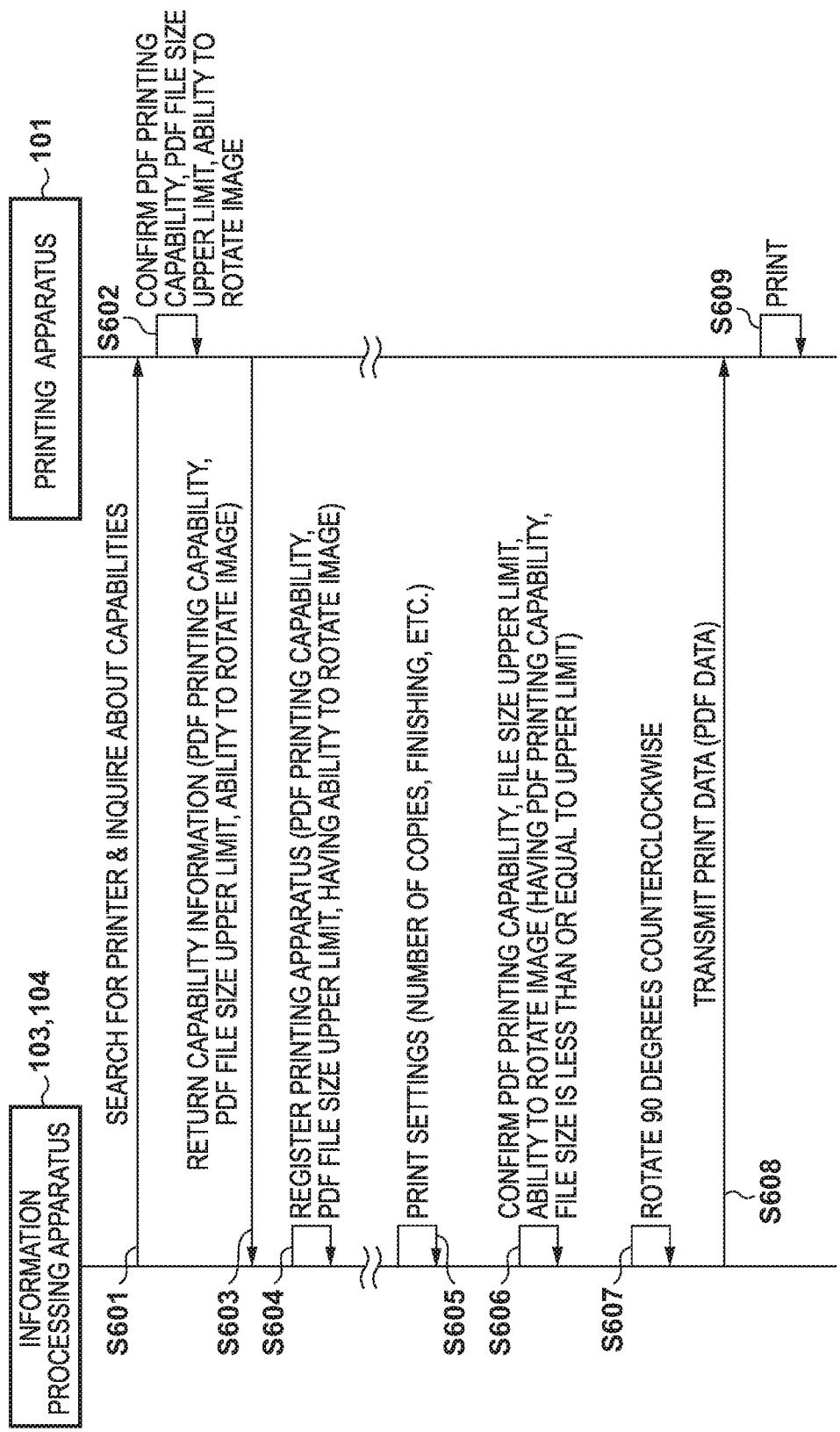
FIG. 6 is a sequence chart illustrating the flow of printing processing executed between the information processing apparatus and the printing apparatus according to the embodiment.

FIG. 6 is a sequence chart for describing the flow of printing processing executed between the information processing apparatus and the printing apparatus 101 according to the embodiment. This drawing illustrates a case where the printing apparatus 101 has the ability to rotate the image data.

First, in S601, the information processing apparatus searches for the printing apparatus 101, and upon finding the printing apparatus 101, queries the printing apparatus 101 for the capabilities of the printing apparatus 101. In response, in S602, the printing apparatus 101 creates the capability information, which includes whether or not the printing apparatus 101 has the ability to print PDFs, the maximum data size of PDF files that can be received, whether or not the printing apparatus 101 has the ability to rotate image data (yes), and so on. Then, in S603, the printing apparatus 101 notifies the information processing apparatus of the created capability information. Accordingly, in S604, the information processing apparatus receives the printer capability information which has been communicated (the ability to print PDFs, the maximum data size of PDF files that can be received, and the ability to rotate images) and stores the printer capability information in the printer information managing module 515.

Next, in S605, the user uses the information processing apparatus to call a printing function to print landscape image (horizontally-oriented image) data from the application 501, and instructs printing to be performed after making settings such as a number of copies to be printed and finishing. At this time, finishing which requires the landscape image data to be rotated is also instructed. This setting is communicated to the job attribute generating module 506 from the settings managing module 511. The PDF generating module 512 then generates PDF data from the data received from the application 501 and saves all the pages in the PDF saving module 505. On the basis of the job attributes, the page generating module 507 obtains the fact that it is necessary to rotate the landscape image data.

Next, in S606, the information processing apparatus refers to the capability information of the printing apparatus 101 (the ability to print PDFs, the maximum data size of PDF files that can be received, and the ability to rotate) saved in the printer information managing module 515. Assume here that the printing apparatus 101 has the ability to print PDF data and that the size of the PDF data saved in the PDF saving module 505 is smaller than the maximum data size. At this time, in S607, the page generating module 507 generates PDF print data having rotated the landscape image data in the counterclockwise (left) direction by 90 degrees. Then, in S608, the print spooler 509 sequentially transmits the print job generated by the IPP client control module 503 to the printing apparatus 101 through the data communication control module 510. In S609, the printing apparatus 101 receives and analyzes the print data, and then performs the printing processing.

Here, the data of a PDF file is being transmitted, and the data size of the PDF file is less than or equal to the maximum data size, and thus the landscape data is transmitted after being rotated 90 degrees to the left.

This embodiment provides a control mechanism through which even when converting a PDF file into raster data and then transmitting the data, for example, an output result equivalent to that of the pre-conversion format can be obtained.

FIG. 7 is a sequence chart for describing the flow of printing processing executed between the information processing apparatus and the printing apparatus 101 according to the embodiment. This drawing illustrates a case where the printing apparatus 101 has the ability to print PDF data but lacks the ability to rotate the image data. S701 to S703 in FIG. 7 are the same as S601 to S603 in FIG. 6 and therefore will not be described here.

In S704, the information processing apparatus receives the printer capability information which has been communicated (the ability to print PDFs, the maximum data size of PDF files that can be received, and the inability to rotate images) and stores the printer capability information in the printer information managing module 515.

Next, in S705, the user uses the information processing apparatus to call a printing function to print landscape image (horizontally-oriented image) data from the application 501, and instructs printing to be performed after making settings such as a number of copies to be printed and finishing. At this time, finishing which requires the landscape image data to be rotated is also instructed. This setting is communicated to the job attribute generating module 506 from the settings managing module 511. The PDF generating module 512 then generates PDF data from the data received from the application 501 and saves all the pages in the PDF saving module 505. On the basis of the job attributes, the page generating module 507 obtains the fact that it is necessary to rotate the landscape image data.

Next, in S706, the information processing apparatus refers to the capability information of the printing apparatus 101 (the ability to print PDFs, the maximum data size of PDF files that can be received, and the inability to rotate images) saved in the printer information managing module 515. Assume here that the printing apparatus 101 has the ability to print PDF data, the size of the PDF data saved in the PDF saving module 505 is larger than the maximum data size, and the printing apparatus 101 lacks the ability to rotate images. At this time, in conjunction with the raster generating module 508, the page generating module 507 generates raster print data by rotating the PDF data saved in the PDF saving module 505 in S707 90 degrees to the left, instead of in the clockwise (right) direction as performed conventionally. Then, in S708, the print spooler 509 sequentially transmits the print job, including the raster data, generated by the IPP client control module 503 to the printing apparatus 101 through the data communication control module 510. In S709, the printing apparatus 101 receives and analyzes the print data, and then performs the printing processing. The same sequence is performed when the printing apparatus 101 does not have the ability to print PDF data, the size of the PDF data is smaller than the maximum data size, and the printing apparatus 101 is not capable of rotating images.

Accordingly, even when landscape PDF data is converted to raster image data in the PWG-Raster format, the same image orientation as when transmitting print data using the PDF format can be achieved. Thus even when the data has been converted to PWG-Raster, stapling and the like, for example, can be applied at a designated location of the output onto which the landscape image has been printed, as per the user's intentions.

FIG. 8 is a sequence chart for describing the flow of printing processing executed between the information processing apparatus and the printing apparatus 101 according to the embodiment. This drawing illustrates a case where the printing apparatus 101 has the ability to rotate image data and the size of the PDF data is larger than the maximum data size. S801 to S804 in FIG. 8 are the same as S601 to S604 in FIG. 6 and therefore will not be described here.

In S805, the user of the information processing apparatus calls the printing function to print a landscape image from the application 501, makes settings such as a number of copies and finishing, and then instructs the printing to be performed. At this time, finishing which requires the landscape image to be rotated is also instructed. The information set in this manner is communicated to the job attribute generating module 506 from the settings managing module 511. The PDF generating module 512 then generates PDF data from the data received from the application 501 and saves all the pages in the PDF saving module 505. On the basis of the job attributes, the page generating module 507 obtains the fact that it is necessary to rotate the landscape image.

Next, in S806, the IPP client control module 503 refers to the capability information of the printing apparatus 101 (the ability to print PDFs, the maximum data size of PDF files that can be received, and the ability to rotate images) saved in the printer information managing module 515. Assume here that the printing apparatus 101 has the ability to print PDF data, the size of the PDF data saved in the PDF saving module 505 is larger than the maximum data size, and the printing apparatus 101 has the ability to rotate images. In this case, in conjunction with the raster generating module 508, the page generating module 507 generates raster print data by rotating the PDF data saved in the PDF saving module 505 in S807 by 90 degrees to the right. At this time, the print job generating module 504 generates print job attributes to which an attribute indicating that the original data is a PDF file has been added. Then, in S808, the print spooler 509 sequentially transmits the print job generated by the IPP client control module 503 to the printing apparatus 101 through the data communication control module 510.

Accordingly, in S809, the printing apparatus 101 analyzes the received print data and discovers that the "original-format" in the job attributes is "PDF". The image data is therefore rotated 180 degrees, and in S810, the printing processing is performed.

Note that when the printing apparatus 101 lacks the ability to print PDF data but has the ability to rotate image data, the same processing is performed, regardless of how large or small the PDF file size is.

Through this, when the user has, for example, set the position of stapling to the upper-left, an output result of printing a landscape image can be stapled at the upper-left even when PDF data has been converted to PWG-Raster.

FIG. 9A to FIG. 9C are diagrams illustrating an example of a message 900 pertaining to the capability inquiry (S601) output from the information processing apparatus to the printing apparatus 101, a capability response 901 (S603) made from the printing apparatus 101 to the information processing apparatus in response thereto, and a job ticket of a print job generated by the information processing apparatus in accordance with the capability notification from the printing apparatus 101.

In the capability response 901 illustrated in FIG. 9B, reference numeral 902 denotes that the printing apparatus 101 has the ability to print PDF data. Reference numeral 903 denotes a maximum value of 2 gigabytes for the size of PDF files which can be received. Furthermore, reference numeral 904 denotes "normal" for transmission of the back side in double-sided printing (that the transmission may be performed without taking anything into account), i.e., that the printing apparatus 101 is capable of rotating images.

This pwg-raster-document-sheet-back attribute can take on values of "normal", "manual-tumble", "rotated", and "flipped". Here, the printing apparatus 101 has no rotation capabilities aside from "normal", and thus rotation is specified on the information processing apparatus side so that it is not necessary for the printing apparatus 101 to rotate the image data.

A print job 910 includes OS information 911 of the OS running on the information processing apparatus which produced the job. Information 912 indicating that the original format is a PDF file is included as well.

FIG. 10 is a diagram illustrating an example of the data structure and data in the PWG-Raster format according to the embodiment.

PWG-Raster has "SynchronizationWord" headers 1001 and 1011 and page headers 1002 and 1012 for the number of pages. An Orientation attribute in the header information makes it possible to know whether the image is in a portrait (longer in the vertical direction) or a landscape orientation, as well as the position of the top of the image. With PWG-Raster, the orientation of the top of the image can be determined from the Orientation attribute. However, PDF data does not have an attribute indicating the orientation of the top, and thus with a landscape image, the upper side of the image is the top, and when the image is rotated, the left side becomes the top.

In addition to Landscape, the Orientation attribute includes Portrait, ReverseLandscape, and ReversePortrait. When a landscape image has been rotated 90 degrees to the left, the page generating module 507 and the raster generating module 508 set the Orientation attribute to Landscape. The Orientation attribute is set to ReverseLandscape when a landscape image has been rotated 90 degrees to the right.

Figure 11A:
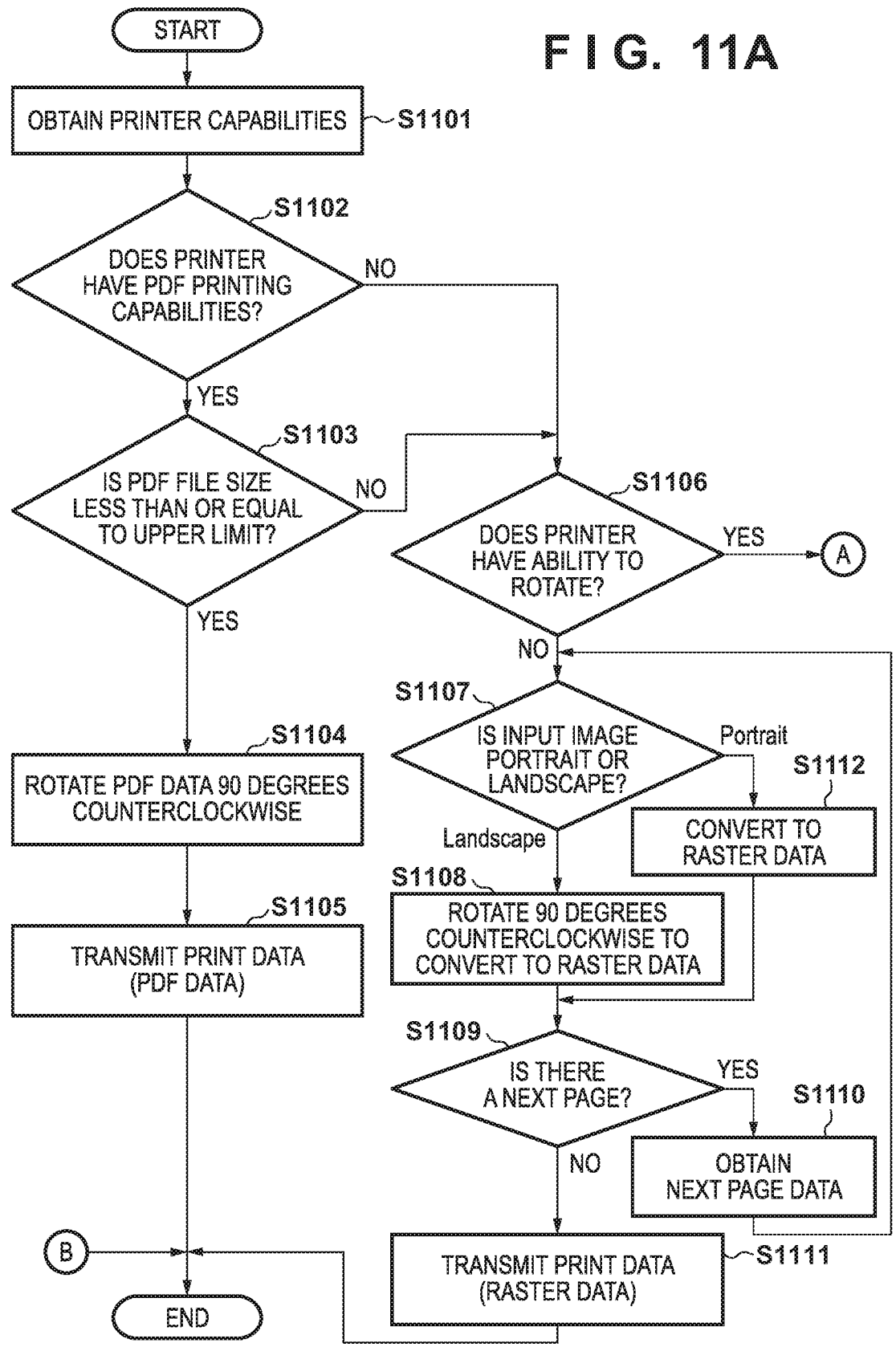
FIG. 11A is a flowchart for describing processing through which an application in the information processing apparatus accepts a printing instruction and transmits print data to the printing apparatus, according to the embodiment.

FIG. 11A and FIG. 11B are flowcharts for describing processing through which the application 501 in the information processing apparatus accepts a printing instruction and transmits print data to the printing apparatus 101, according to the embodiment. Note that the processing described in the flowcharts is realized by the CPU 401 executing programs deployed into the RAM 403 from the storage 404.

First, in S1101, the CPU 401 obtains the capability information of the printing apparatus 101, which was obtained from the printing apparatus 101 and held in the RAM 403 in S603 of FIG. 6. The processing then advances to S1102, where the CPU 401 determines whether or not the printing apparatus 101 has the ability to print PDF data on the basis of the capability information. When the printing apparatus 101 has the ability to print PDF data, the processing advances to S1103, where the CPU 401 determines whether or not the data size of the PDF data serving as the print data is less than or equal to the maximum data size which can be received by the printing apparatus 101. Here, if the data size of the PDF data is less than or equal to the maximum data size which can be received by the printing apparatus 101, the processing advances to S1104, where the CPU 401 generates PDF print data in which the saved PDF data is rotated 90 degrees to the left. Note that if the PDF data content is longer vertically (i.e., portrait), the rotation processing of S1104 is omitted. The processing then advances to S1105, where the CPU 401 transmits the rotated PDF data to the printing apparatus 101 along with the job attributes of that print data, after which this processing ends.

On the other hand, if the CPU 401 determines in S1102 that the printing apparatus 101 does not have the ability to print PDF data, the processing advances to S1106. Additionally, if the CPU 401 determines in S1103 that the data size of the PDF data is not less than or equal to the maximum data size which can be received by the printing apparatus 101, the processing advances to S1106. In S1106, the CPU 401 refers to the aforementioned capability information of the printing apparatus 101 and determines whether or not the printing apparatus 101 has the ability to rotate images. Here, if it is determined that the printing apparatus 101 does not have the ability to rotate images, the processing advances to S1107, where the CPU 401 determines whether the PDF data is Portrait or Landscape data. If it is determined that the PDF data is Landscape data, the processing advances to S1108, where a raster image is generated by rotating that PDF data 90 degrees to the left, after which the processing advances to S1109. On the other hand, if the CPU 401 determines in S1107 that the PDF data is Portrait data, the processing advances to S1112, where the PDF data is converted to raster data; the processing then advances to S1109. In S1109, if the CPU 401 determines that the PDF data includes multiple pages and there is a next page, the processing advances to S1110, where the CPU 401 obtains the data of the next page; the processing then advances to S1107. In this manner, when the processing for converting the final page of the PDF data into raster data ends, the processing advances to S1111, where the CPU 401 transmits the generated raster data to the printing apparatus 101 along with the job attributes, and then ends this processing.

On the other hand, if the CPU 401 determines in S1106 that the printing apparatus 101 has the ability to rotate images, the processing advances to S1113, where the CPU 401 sets an attribute indicating that the original format is PDF ("original-format") in the job attributes. Next, in S1114, the CPU 401 determines whether the PDF data is Portrait or Landscape data. Here, if it is determined that the PDF data is Landscape data, the processing advances to S1115, where raster image data is generated by rotating that PDF data 90 degrees to the right, after which the processing advances to S1116. On the other hand, if the CPU 401 determines in S1114 that the PDF data is Portrait data, the processing advances to S1119, where the PDF data is converted to raster data; the processing then advances to S1116. In S1116, if the CPU 401 determines that the PDF data includes multiple pages and there is a next page, the processing advances to S1117, where the CPU 401 obtains the data of the next page; the processing then advances to S1114. In this manner, when the processing for converting the final page of the PDF data into raster data ends, the processing advances to S1118, where the CPU 401 transmits the generated raster data to the printing apparatus 101 along with the job attributes (indicating that the original format is PDF), and then ends this processing.

Figure 12A:
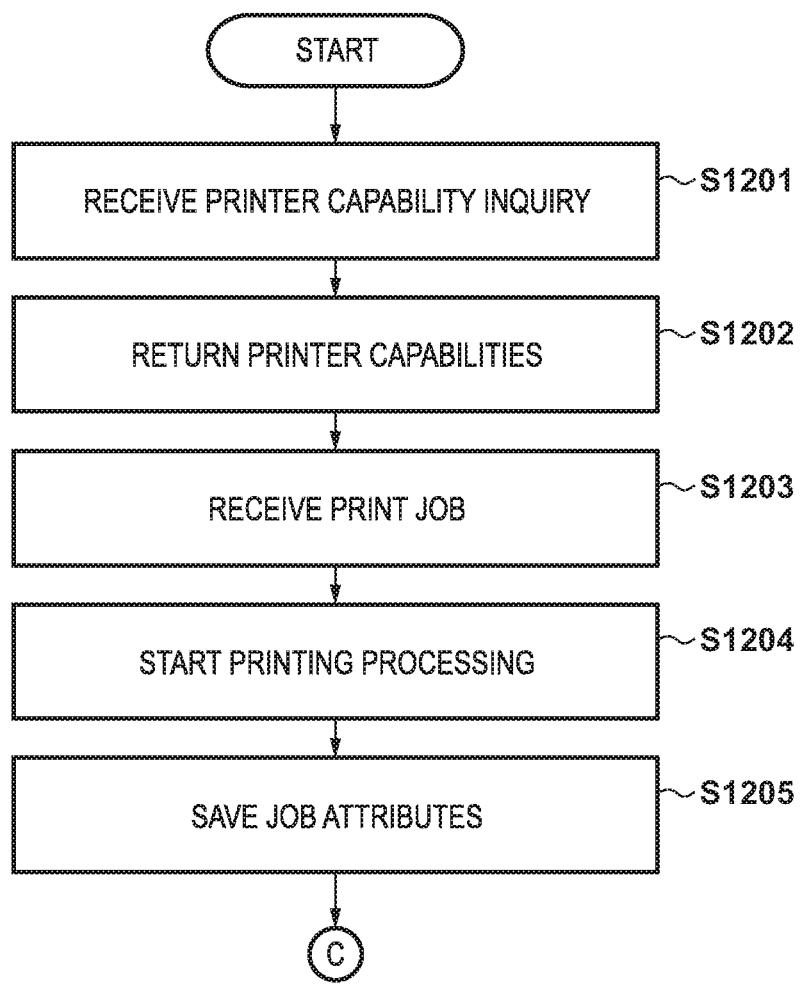
FIG. 12A is a flowchart for describing processing through which the printing apparatus receives a print job from the information processing apparatus and prints the print job, according to the embodiment.
Figure 12B:
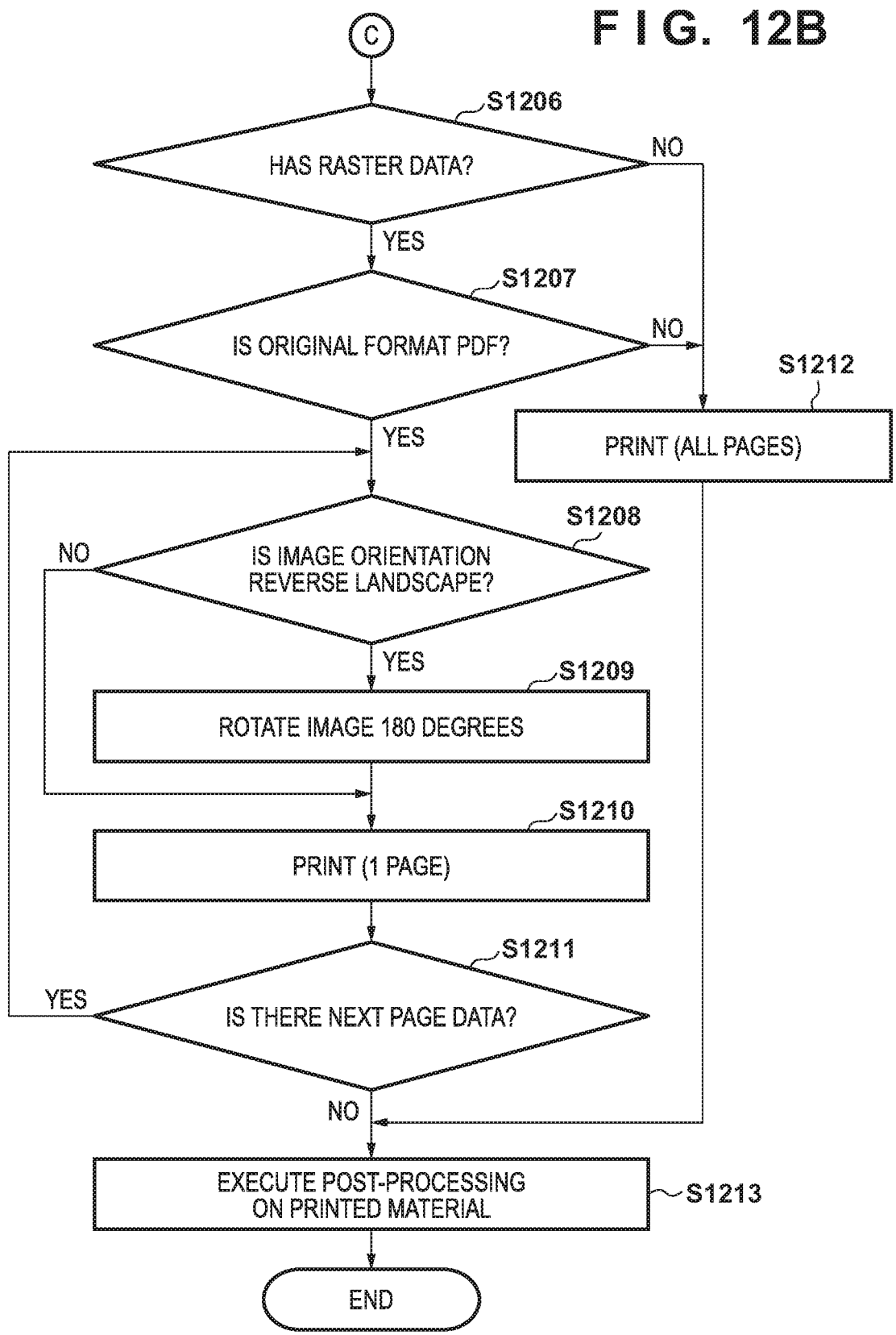
FIG. 12B is a flowchart for describing processing through which the printing apparatus receives a print job from the information processing apparatus and prints the print job, according to the embodiment.

FIG. 12A and FIG. 12B are flowcharts for describing processing through which the printing apparatus 101 receives a print job from the information processing apparatus and prints the print job, according to the embodiment. Note that the processing described in the flowcharts is realized by the CPU 211 executing programs deployed into the RAM 213 from the storage 214. Note also that the flowchart will be described assuming that the printing apparatus 101 has the ability to rotate images.

First, in S1201, upon receiving a printing capability inquiry from an information processing apparatus, the CPU 211 returns the configuration information of the printing unit 218, along with the capability information stored in the RAM 213 or the storage 214 in advance, to the information processing apparatus. The capability information returned at this time includes PDF printing capabilities (whether PDF is included in the supported formats), indicated by the reference numeral 902 in FIG. 9B; the maximum data size of PDF files which can be received, indicated by the reference numeral 903; whether or not the printing apparatus has the ability to rotate images (processing for the back side in double-sided printing), indicated by the reference numeral 904; and the like.

The processing then advances to S1203, where the CPU 211 receives a print job based on the IPP standard from the information processing apparatus over the network. Next, the processing advances to S1204, where the CPU 211 registers the received print job as a new job and starts the printing processing. The processing then advances to S1205, where the CPU 211 saves the print settings information, the job attributes, and the like to be applied to the print job in the RAM 213. If job attributes indicating that the original format is PDF have been added to the job received at this time, those attributes are saved as well.

Next, the processing advances to S1206, where the CPU 211 determines whether or not the received print job is raster data; if the print job is not raster data, the processing advances to S1212, where the printing processing is executed for all pages on the basis of the PDF data, after which the processing advances to S1213. On the other hand, when the print job is raster data, the processing advances to S1207, where the CPU 211 determines whether or not the original format is PDF. Here, the original format is determined to be PDF when attributes indicating that the original format is PDF (e.g., the attributes indicated by 912) have been added as the job attributes of the received print job. Although the processing advances to S1208 when it is determined that the original format is PDF, the processing advances to S1212 when such is not the case, where the printing processing is executed for all pages on the basis of the raster data, after which the processing advances to S1213. Although a case where attributes indicating that the original format is PDF are used is given as an example here, the configuration is not limited thereto. For example, attribute information indicating that the format has been converted due to the upper limit on the size being exceeded may be used.

In S1208, the CPU 211 determines whether or not the orientation of the page data being processed is Reverse-Landscape. If such is the case, the processing advances to S1209, where the CPU 211 generates image data, in which the image has been rotated 180 degrees to match the rotation of the PDF data, as well as page attributes, after which the processing advances to S1210. In S1210, printing is executed on the basis of the image data. On the other hand, if the orientation of the page data is not ReverseLandscape in S1208, the processing advances to S1210 without the image being rotated, and one page's worth of printing is executed. The processing then advances to S1211, where the CPU 211 determines whether or not the received print job includes multiple pages and there is a next page; the processing advances to S1208 if it is determined that there is a next page. The processing advances to S1213 once the final page of the received print data has been printed. In S1213, in conjunction with the sheet processing unit 221, the CPU 211 executes post-processing such as binding processing, punching processing, and the like on the printed material. The processing ends once this post-processing is complete. Note that the processing of S1213 is not performed when post-processing is not set for the print job.

As described above, according to the embodiment, when the printing apparatus has the ability to print PDF data and the data size of the PDF data is less than or equal to the maximum data size which the printing apparatus can receive, the PDF data can be received and printed.

If the data size of the PDF data exceeds the maximum data size which can be received by the printing apparatus, the information processing apparatus can convert the data into raster data such as PGW-Raster and transmit that data. Furthermore, when converting a PDF to raster data and transmitting the data, if the printing apparatus does not have the ability to rotate images, the raster data can be generated and transmitted at a rotation angle that matches the rotation angle of the PDF format.

When the information processing apparatus further converts the PDF to PGW-Raster and sends the data, if the printing apparatus has the ability to rotate images, the converted raster data and information indicating that the original format is PDF is transmitted. On the basis of the received information, the printing apparatus can print the raster data so as to match the rotation angle of the original PDF data by rotating the raster data 180 degrees.

Accordingly, when, for example, a finishing setting is active in the print settings, a problem in which the right side of the paper will be located at the top of the printed image, despite it being assumed that the left side of paper will be located at the top, can be prevented from arising. Additionally, a situation where, when the data size of the PDF data exceeds the maximum data size which the printing apparatus can receive, the printing processing fails, can be suppressed.

In the foregoing embodiment, whether or not to rotate the raster image by 180 degrees is determined on the basis of the original format and the orientation of the image; however, this determination may also be made on the basis of the OS information (911 in FIG. 9C) of the information processing apparatus that submitted the print job, for example.

Additionally, although the embodiment describes PDF and PWG-Raster as examples of formats having different mechanisms, the present invention is not limited thereto. In addition, the processing on the information processing apparatus side may be performed by a server in the cloud (not shown).

According to the present embodiment, an effect can be obtained in which when converting the format of print data, an output result equivalent to that of the pre-conversion format can be obtained even when converting to a format which has different behavior with respect to rotation angles.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
a controller including one or more processors and one or more memories, wherein the controller is configured to:
receive attribute information of a printing apparatus from the printing apparatus;
determine, based on the received attribute information, whether or not to generate a portrait image which format is a predetermined format;
rotate a landscape image in a predetermined rotational direction to generate the portrait image in a case it is determined the portrait image is to be generated;
transmit the generated portrait image to the printing apparatus; and
transmit information indicating the portrait image has been generated from the landscape image.

2. The information processing apparatus according to claim 1, wherein the received attribute information includes an image format supported by the printing apparatus.

3. The information processing apparatus according to claim 1, wherein the controller is further configured to:
accept a designation of a location on which a post processing is to be performed from a user; and
transmit information indicating the location of the post processing based on the designation together with the image data to the printing apparatus.

4. The information processing apparatus according to claim 1, wherein the controller is further configured to:
determine whether or not to rotate the landscape image in a clockwise direction by 90 degrees or in a counterclockwise direction by 90 degrees, based on the received attribute information.

5. The information processing apparatus according to claim 4, wherein the controller is further configured to:
determine whether or not a data size of image data of a landscape image that is generated in a format other than the predetermined format is greater than a predetermined data size; and
determine the rotational direction of the landscape image based on the received attribute information in a case that it is determined that the data size of image data of a landscape image that is generated in the format other than the predetermined format is greater than the predetermined data size.

6. The information processing apparatus according to claim 1, wherein the predetermined format is PWG-Raster.

7. The information processing apparatus according to claim 1, wherein when transmitting the image data to the printing apparatus, the controller transmits the image data to the printing apparatus in Internet Printing Protocol.

8. A printing apparatus comprising:
a controller including one or more processors and one or more memories, wherein the controller is configured to:
receive print data including a portrait image and information indicating the portrait image was generated from a landscape image;
rotate the received portrait image at least in accordance with having received the information; and
execute print process based on the rotated image.

9. The printing apparatus according to claim 8, wherein the controller is further configured to:
rotate the received portrait image by 180 degrees.

10. A method of controlling an information processing apparatus, the method comprising:
receiving attribute information of a printing apparatus from the printing apparatus;
determining, based on the received attribute information, whether or not to generate a portrait image which format is a predetermined format;
rotating a landscape image in a predetermined rotational direction to generate the portrait image in a case it is determined the portrait image is to be generated;
transmitting the generated portrait image to the printing apparatus; and
transmitting information indicating the portrait image has been generated from the landscape image.

11. The method according to claim 10, wherein the received attribute information includes an image format supported by the printing apparatus.

12. The method according to claim 10, further comprising:
accepting a designation of a location on which a post processing is to be performed from a user; and
transmitting information indicating the location of the post processing based on the designation together with the image data to the printing apparatus.

13. The method according to claim 10, further comprising:
determining whether or not to rotate the landscape image in a clockwise direction by 90 degrees or in a counterclockwise direction by 90 degrees, based on the received attribute information.

14. The method according to claim 13, further comprising:
determining whether or not a data size of image data of a landscape image that is generated in a format other than the predetermined format is greater than a predetermined data size; and
determining the rotational direction of the landscape image based on the received attribute information in a case it is determined the data size of image data of the landscape image that is generated in the format other than the predetermined format is greater than the predetermined data size.

15. The method according to claim 10, wherein the predetermined format is PWG-Raster.

16. The method according to claim 10, wherein, in the transmitting the image data to the printing apparatus, the image data is transmitted to the printing apparatus in Internet Printing Protocol.

17. The printing apparatus according to claim 8, wherein the controller is further configured to:
receive a request from the information processing apparatus;
transmit attribute information; and
receive the print data from the information processing apparatus that has received the attribute information, wherein the information processing apparatus generates the portrait image from the landscape image based on the transmitted attribute information.

18. The printing apparatus according to claim 8, wherein the controller is further configured to:
    specify an image format of the received portrait image; and
    rotate the received portrait image in a case the specified image format is a rotated predetermined image format.

19. The printing apparatus according to claim 18, wherein the predetermined image format is PWG-Raster.

20. The printing apparatus according to claim 18, wherein the controller is further configured to:
    receive information related to an OS implemented in the information processing apparatus;
    determine to whether or not to rotate the received portrait image based on the received information related to the OS implemented in the information processing apparatus; and
    rotate the received portrait image in a case it is determined the portrait image is rotated.

* * * * *